United States Patent
Kim et al.

(10) Patent No.: US 10,229,501 B2
(45) Date of Patent: Mar. 12, 2019

(54) MOBILE ROBOT AND METHOD FOR CONTROLLING THE SAME

(71) Applicant: SAMSUNG ELECTRONICS CO., LTD., Suwon-si, Gyeonggi-do (KR)

(72) Inventors: Bo Young Kim, Incheon (KR); No San Kwak, Suwon-si (KR); Kyung Shik Roh, Seongnam-si (KR); Soon Yong Park, Bucheon-si (KR); Suk June Yoon, Seoul (KR); So Hee Lee, Seoul (KR); Min Yong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 53 days.

(21) Appl. No.: 15/340,496

(22) Filed: Nov. 1, 2016

(65) Prior Publication Data

US 2017/0154431 A1   Jun. 1, 2017

(30) Foreign Application Priority Data

Nov. 26, 2015   (KR) ........................ 10-2015-0166271

(51) Int. Cl.
   *G06K 9/00*   (2006.01)
   *G06T 7/00*   (2017.01)

(52) U.S. Cl.
   CPC ........ *G06T 7/0048* (2013.01); *G06K 9/00664* (2013.01); *G06T 2207/10028* (2013.01);
   (Continued)

(58) Field of Classification Search
   CPC ......... G06T 7/0048; G06T 2207/10028; G06T 2207/30241; G06T 2207/30252; G06K 9/00664; Y10S 901/01; Y10S 901/47
   See application file for complete search history.

(56) References Cited

U.S. PATENT DOCUMENTS

2014/0124004 A1* 5/2014 Rosenstein ........... A47L 9/2852
                                                                134/18

FOREIGN PATENT DOCUMENTS

| JP | 2004-357202 | 12/2004 |
| JP | 2006-180429 | 7/2006 |
| KR | 10-2013-0124837 | 11/2013 |

OTHER PUBLICATIONS

Pretto, A., Menegatti, E., Bennewitz, M., Burgard, W., & Pagello, E. (May 2009). A visual odometry framework robust to motion blur. In Robotics and Automation, 2009. ICRA'09. IEEE International Conference on (pp. 2250-2257). IEEE.*

(Continued)

*Primary Examiner* — Jonathan S Lee

(74) *Attorney, Agent, or Firm* — Staas & Halsey LLP

(57) ABSTRACT

A mobile robot and method for controlling the same are provided creating patches in images captured by a camera while the mobile robot is moving, estimating motion blur of the patches, and correcting the position of the mobile robot based on the patch from which the motion blur is eliminated, thereby increasing precision in tracking and reliability through accurate mapping. The mobile robot includes a main body, a traveler to move the main body, a camera combined with the main body to capture an image of a surrounding of the main body, a position detector to create a patch in the image captured by the camera, estimate a motion blur of the patch, and track a position of the main body based on the created patch from which the motion blur is eliminated, and a controller to control the traveler based on the position of the main body.

14 Claims, 11 Drawing Sheets

(52) U.S. Cl.
CPC ........... *G06T 2207/30241* (2013.01); *G06T 2207/30252* (2013.01); *Y10S 901/01* (2013.01); *Y10S 901/47* (2013.01)

(56) References Cited

OTHER PUBLICATIONS

Stelzer, Annett, Heiko Hirschmüller, and Martin Görner. "Stereo-vision-based navigation of a six-legged walking robot in unknown rough terrain." The International Journal of Robotics Research 31.4 (2012): 1-40.*
Hess, Jürgen Michael. "Efficient Approaches to Cleaning with Mobile Robots." (2015).*
Maier, Daniel. "Camera-Based Humanoid Robot Navigation." (2015).*
Oßwald, Stefan, Armin Hornung, and Maren Bennewitz. "Learning reliable and efficient navigation with a humanoid." Robotics and Automation (ICRA), 2010 IEEE International Conference on. IEEE, 2010.*

* cited by examiner

FIG. 2
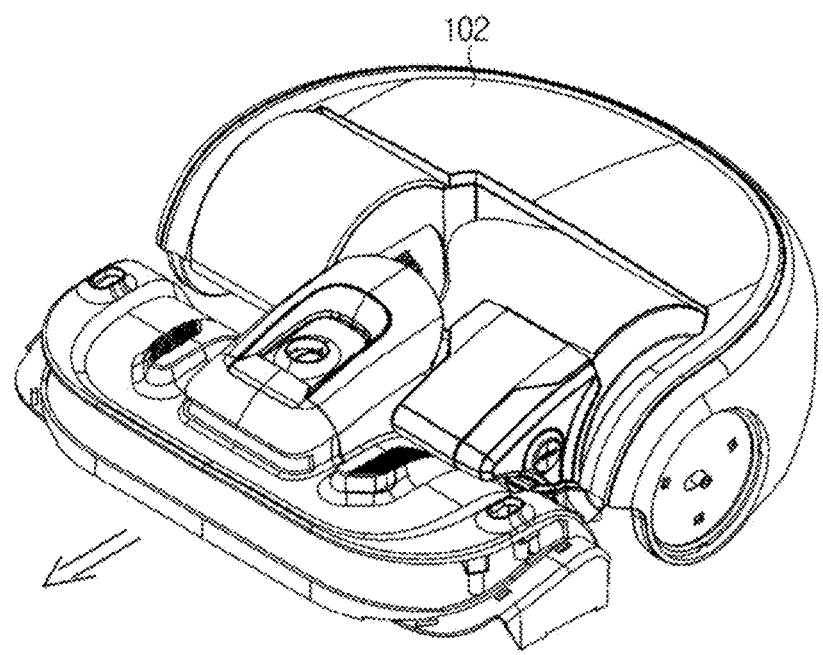
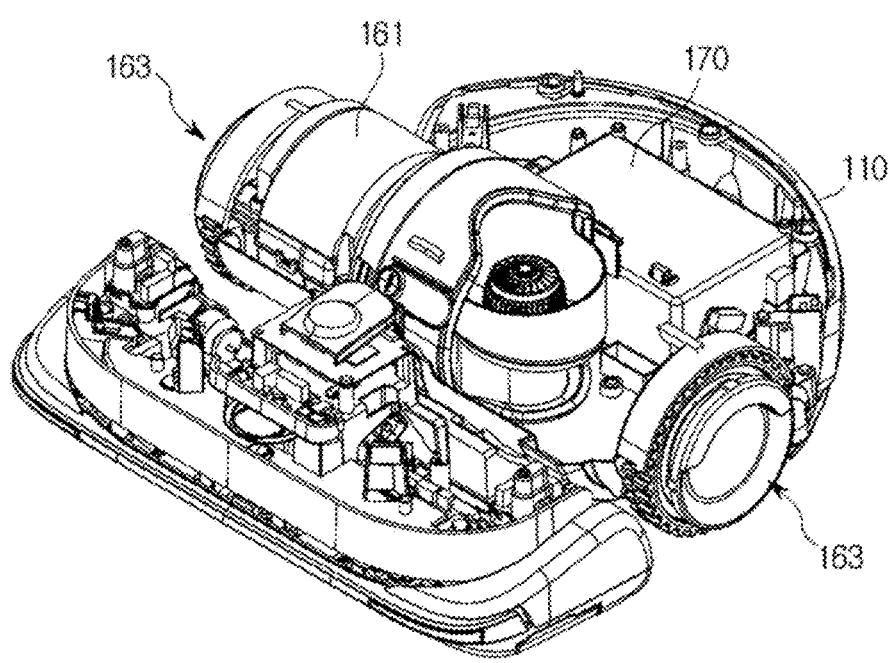

FIG. 9A
(a)
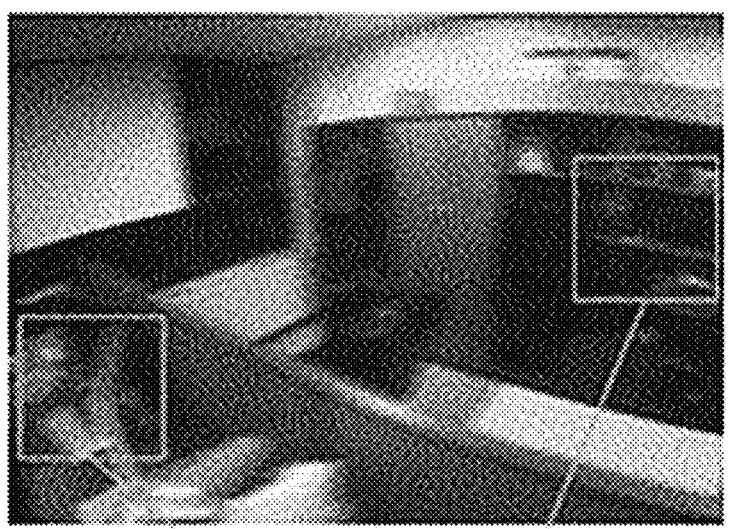
 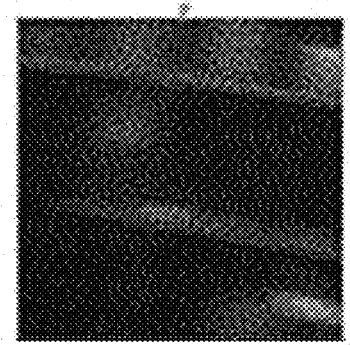
(b)      (c)

FIG. 9B
(a)
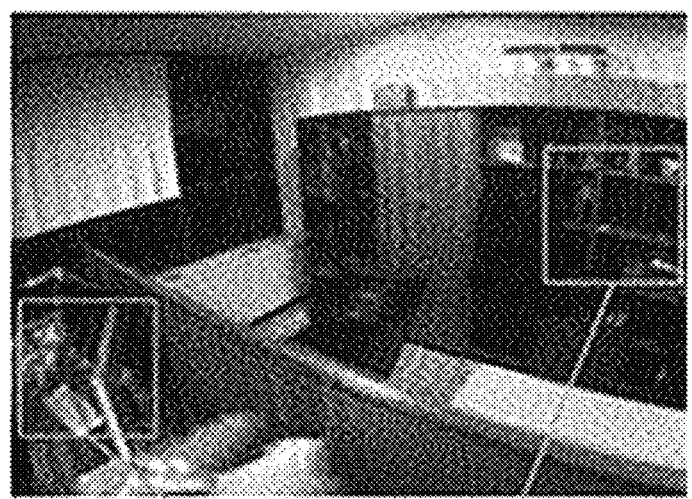
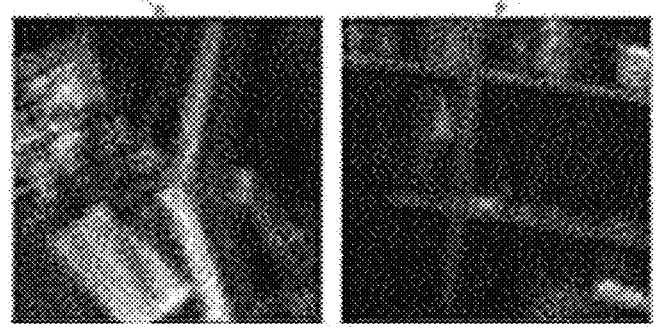
(b)  (c)

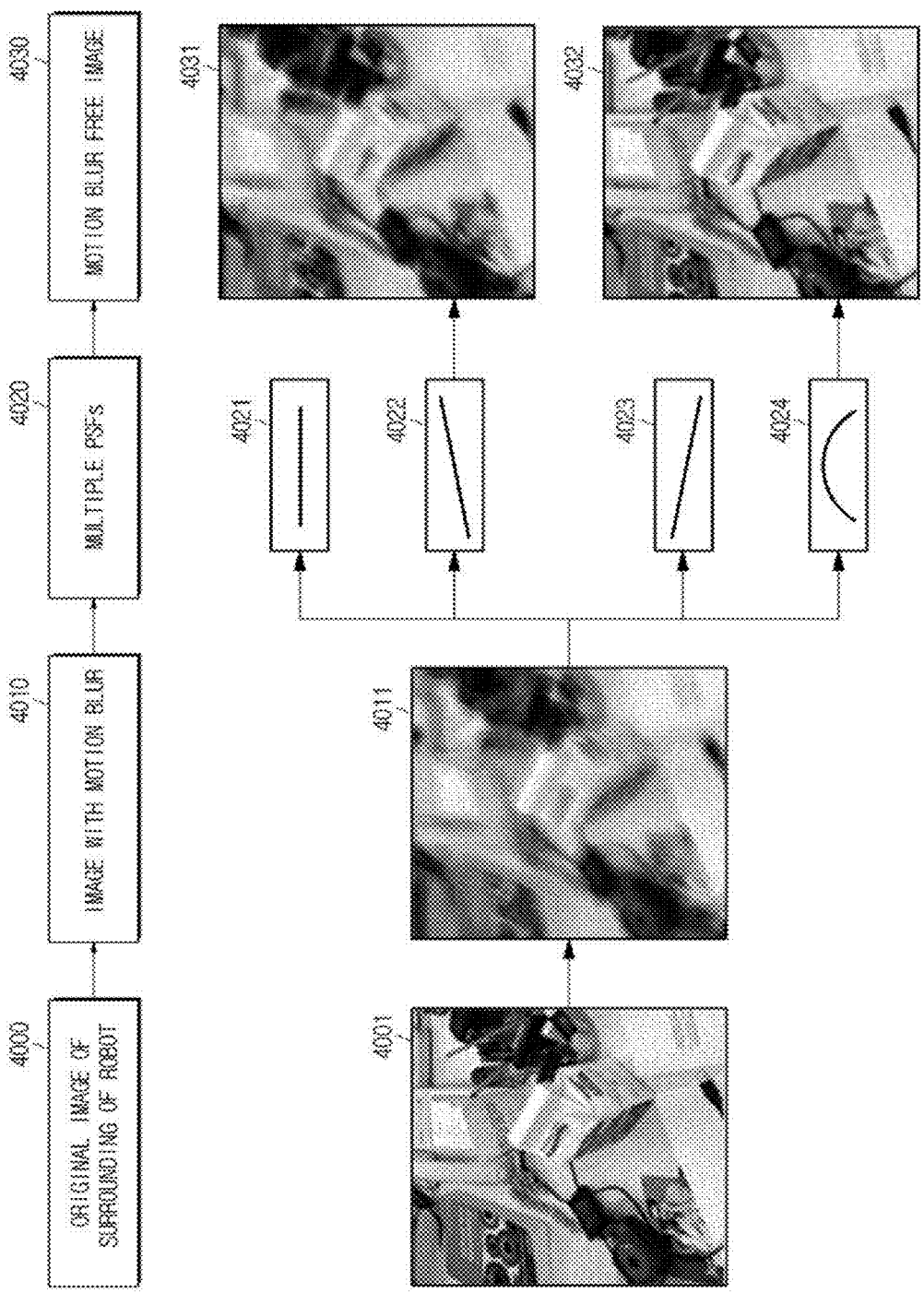

MOBILE ROBOT AND METHOD FOR CONTROLLING THE SAME

CROSS-REFERENCE TO RELATED APPLICATIONS

This application claims priority to, and the benefit of, Korean Patent Application No. 10-2015-0166271, filed on Nov. 26, 2015, the disclosure of which is incorporated herein by reference in its entirety.

BACKGROUND

1. Field

The present disclosure relates to a mobile robot and method for controlling the same, whereby analyzing images captured by a camera and tracking the position of the mobile robot.

2. Description of the Related Art

In general, mobile robots perform tasks while autonomously moving across a desired area without intervention of the user. The mobile robots have recently been utilized in various areas with development of sensors and controllers, and there exist, for example, cleaning robots, telepresence robots, and security robots.

For the autonomous movement, location awareness is essentially required for the mobile robot to locate its position. Visual odometry is an example of how the mobile robot recognizes its position.

The visual odometry is a process of determining the position and orientation of the mobile robot by analyzing the associated camera images, and has been used in a wide variety of robotic applications.

The visual odometry uses consecutive camera images to estimate the distance traveled by a mobile robot. In other words, camera-based visual odometry may recognize key points in images captured by a camera, and trace the position of the camera or things through relations between the key points in a sequence of images captured by the camera.

Herein, the key points of the images are called features, and tracing the position is called tracking. A process of the mobile robot recognizing its position using the visual odometry is called Visual Simultaneous Localization and Mapping (Visual SLAM).

In the meantime, in the process of acquiring images, the wheeled mobile robot suffers from precision problems since wheels tend to slip and slide on the floor or wobble while traveling on non-smooth floors. In addition, cameras also wobble because the wheeled mobile robot travels with non-standard locomotion.

In this case, the wobble of the cameras of the mobile robot may lead to motion blur in the images taken by the cameras.

When the images are blurred by the motion blur, the mobile robot has difficulty in locating the features, causing the decline of precision in tracking and visual SLAM.

SUMMARY

Additional aspects and/or advantages will be set forth in part in the description which follows and, in part, will be apparent from the description, or may be learned by practice of the invention.

To address the problem, the present disclosure provides a mobile robot and method for controlling the same, whereby creating patches in images captured by a camera while the mobile robot is moving around, estimating motion blur of the patches, correcting the position of the mobile robot based on the patch from which the motion blur is eliminated, thereby increasing precision in tracking and Visual Simultaneous Localization and Mapping (Visual SLAM) and increasing reliability from a user in the product through accurate mapping.

In accordance with an aspect of the present disclosure, a mobile robot includes a main body, a traveler configured to move the main body, a camera combined with the main body and configured to capture an image of a surrounding of the main body, a position detector configured to create a patch in the image captured by the camera, to estimate a motion blur of the patch, and to track a position of the main body based on the created patch from which the motion blur is eliminated, and a controller configured to control the traveler based on the position of the main body tracked by the position detector.

The position detector may be configured to create at least a piece of blur information based on at least one of three dimensional (3D) feature coordinates, movement information of the main body, and a capturing time interval of the camera, and estimate motion blur of the patch based on the at least a piece of the blur information.

The position detector may be configured to estimate motion blur of the patch among the at least a piece of blur information based on an objective function.

The at least a piece of blur information may include a curved form of blur information.

The position detector may be configured to estimate motion blur of the patch using a Gaussian distribution or a Poisson distribution as the objective function.

The position detector may be configured to obtain an aspect of motion blur in the image based on an image captured by the camera and movement information of the main body determined by the controller.

The position detector may be configured to create the patch in the image captured by the camera based on the aspect of motion blur.

The position detector may be configured to determine matching relations between patches of previous and current images captured by the camera based on the patches from which motion blur is eliminated.

The position detector is configured to track a position of the main body using the least square method based on the matching relations.

The mobile robot may further include a storage for storing an image captured by the camera and the patch created in the image.

In accordance with another aspect of the present disclosure, a method for controlling a mobile robot includes capturing an image of a surrounding of a mobile robot; creating a patch in the captured image, estimating a motion blur in the created patch, and tracking a position of the mobile robot based on the created patch from which the estimated motion blur is eliminated.

The estimating motion blur in the created patch may include creating at least a piece of blur information based on at least one of three dimensional (3D) feature coordinates, movement information of the mobile robot, and a capturing time interval, and estimating motion blur of the patch based on the at least a piece of the blur information.

The estimating motion blur in the created patch may include estimating motion blur of the patch among the at least a piece of blur information based on an objective function.

The at least a piece of blur information may include a curved form of motion blur.

The estimating motion blur in the created patch may include estimating motion blur of the patch using the Gaussian distribution or Poisson distribution as the objective function.

The estimating motion blur in the created patch may include estimating motion blur of the patch using the objective function to which a normalization term is added.

The creating a patch in the captured image may include obtaining an aspect of motion blur in the image based on the captured image and movement information of the mobile robot.

The creating a patch in the captured image may include creating the patch in the captured image based on the obtained aspect of motion blur.

The tracking a position of the mobile robot based on the patch from which the estimated motion blur is eliminated may include determining matching relations between patches of previous and current images captured, based on the patches from which motion blur is eliminated, and tracking a position of the mobile robot using the least square method based on the matching relations.

BRIEF DESCRIPTION OF THE DRAWINGS

These and/or other aspects and advantages will become apparent and more readily appreciated from the following description of the embodiments, taken in conjunction with the accompanying drawings.

FIG. 2 schematically shows an exterior of a mobile robot according to an embodiment of the present disclosure.

FIGS. 9A and 9B illustrate images for explaining image deblurring based on wrong motion blur.

FIG. 10 is a diagram for comparison with an image deblurred using various forms of PSF.

DETAILED DESCRIPTION

Figure 1:
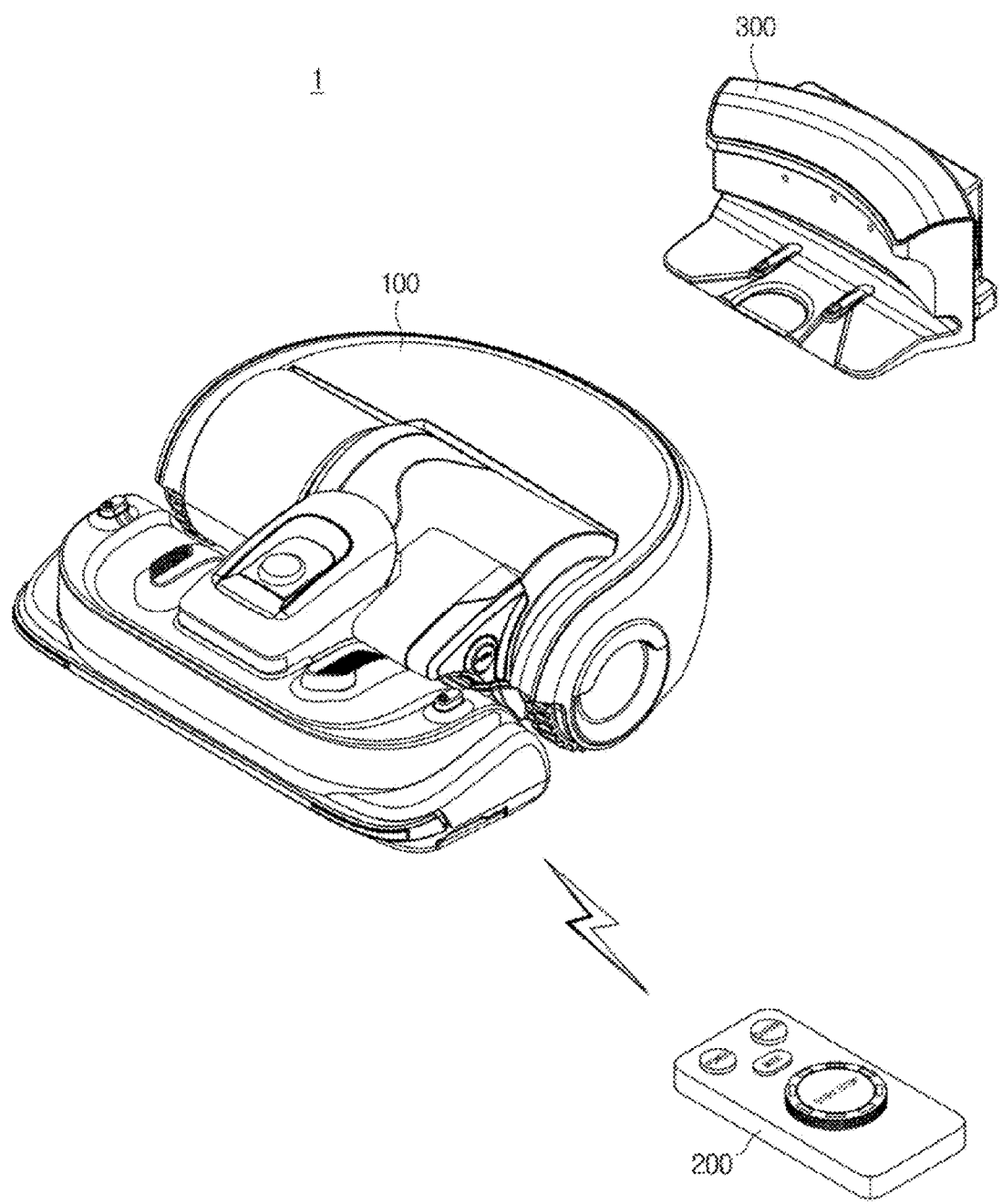
FIG. 1 shows the a mobile robot system according to an embodiment of the present disclosure.

Reference will now be made in detail to the embodiments, examples of which are illustrated in the accompanying drawings, wherein like reference numerals refer to the like elements throughout. The embodiments are described below to explain the present invention by referring to the figures.

FIG. 1 shows the entirety of a mobile robot system, according to an embodiment of the present disclosure.

Referring to FIG. 1, a mobile robot system 1 may include a mobile robot 100 for performing a task while autonomously moving across an area, a device 200 separated from the mobile robot 100 for remotely controlling the mobile robot 100, and a charging station 300 separated from the mobile robot 100 for charging battery power of the mobile robot 100.

The mobile robot 100 is a device for performing a function corresponding to a control command received from the device 200, and may be equipped with a rechargeable battery and an obstacle sensor to avoid obstacles while the mobile robot 100 is moving around, thereby autonomously traveling and working in a work area.

Furthermore, the mobile robot 100 may be aware of its position through a camera 150 without information about surrounding conditions, and may perform a process of localization and map building to create a map from information about an environment, i.e., perform Visual Simultaneous Localization and Mapping (Visual SLAM).

The mobile robot 100 may have various forms in addition to what is shown in FIG. 1. In the embodiment of the present disclosure, the mobile robot 100 uses travelers 160 (see FIG. 3) with moving wheels 163 (see FIG. 3). In another embodiment, however, the traveler 160 may have two legs like a human instead of wheels. The concept of the present disclosure may be applied for a robot to estimate a visual distance traveled and to determine its position based on captured images.

The device 200 is a remote control device for wirelessly transmitting a control command to control movement of the mobile robot 100 or force the mobile robot 100 to perform a task, and may include a cell phone or Personal Communication Service (PCS) phone, a smart phone, a Personal Digital Assistant (PDA), a Portable Multimedia Player (PMP), a laptop computer, a digital broadcasting terminal, a netbook, a tablet, a navigation device, etc.

In addition, the device 200 may include a device that is able to implement various functions using various application programs, such as a digital camera, camcorder, etc., equipped with a wired/wireless communication function.

The device 200 may also be a simple form of a common remote controller. The remote controller typically exchanges signals with the mobile robot 100 using Infrared Data Association (IrDA).

The device 200 may exchange wireless communication signals with the mobile robot 100 using various communication schemes, such as Radio Frequency (RF), Wireless Fidelity (Wi-Fi), Bluetooth, Zigbee, near field communication (NFC), Ultra Wide Band (UWB) communication, etc., without being limited thereto. The device 200 may use any communication scheme that may exchange wireless communication signals with the mobile robot 100.

The device 200 may include a power button to control power on/off of the mobile robot 100, a return-to-charge button to instruct the mobile robot 100 to return to the charging station 300 for charging the battery of the mobile robot 100, a mode button to change control mode of the mobile robot 100, a start/stop button to start/stop operation of the mobile robot 100 or initiate, cancel, or confirm a control command, a dial, etc.

The charging station 300 is for charging the battery of the mobile robot 100, and may be equipped with a guide member (not shown) to guide the mobile robot 100 to dock with the charging station 300. The guide member may be equipped with a connection terminal (not shown) to charge a power unit 170 of the mobile robot 100.

FIG. 2 schematically shows the exterior of a mobile robot, according to an embodiment of the present disclosure.

Referring to FIG. 2, the mobile robot 100 is configured to include a main body 101 for forming the exterior, a cover 102 for covering the top of the main body 101, the power unit 170 for supplying operation power to operate the main body 101, and travelers 160 for moving the main body 101.

The main body 101 forming the exterior of the mobile robot 100 supports various components built therein.

The power unit 170 may include a battery electrically connected to the respective loads to drive the travelers 160 and the body 101 for supplying power thereto. The battery is a rechargeable secondary battery, and is charged by receiving power from the charging station 300 while the main body 101 is connectable with the charging station 300, for example, after completing a task.

If the remaining power runs short, the power unit 170 is charged by receiving charging current from the charging station 300.

A caster wheel may be installed on the front of the main body 101, the rotation angle of which may change depending on the condition of the floor on which the mobile robot 100 travels. The caster wheel may support the mobile robot 100 by being used to stabilize the posture and prevent a fall of the mobile robot 100. The caster wheel 165 may have the shape of roller or caster.

The travelers 160 are equipped on either side from the center of the main body 101 for enabling the main body 101 to move forward, move backward, or turn while performing a task.

The both travelers 160 may enable the mobile robot 100 to move forward, move backward, or turn by moving forward, moving backward, or turning according to an instruction of a controller 110 (see, for example, FIG. 3) as will be described below. For example, the mobile robot 100 may move forward or move backward by turning the both travelers 160 to the forward or backward direction. Furthermore, the mobile robot 100 may turn to the left by turning the right traveler 160 to the forward direction while turning the left traveler 160 to the backward direction, and may turn to the right by turning the left traveler 160 to the forward direction while turning the right traveler 160 to the backward direction.

In an embodiment of the present disclosure, a camera 131 for capturing surrounding images may be equipped on the front of the mobile robot 100. Details of an exemplary camera 131 are described in connection with FIG. 3.

Figure 3:
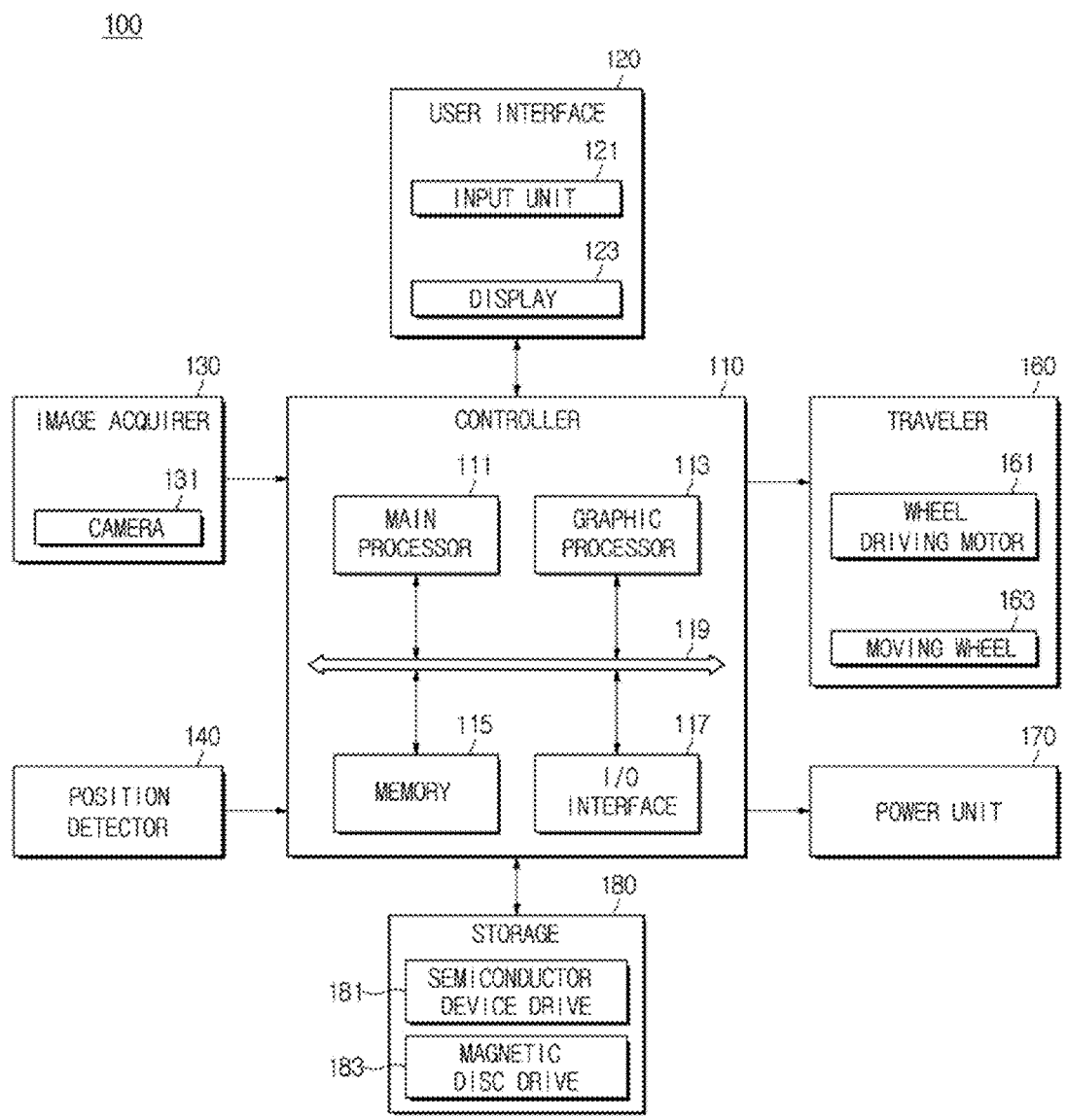
FIG. 3 is a control block diagram for location awareness of a mobile robot according to an embodiment of the present disclosure.

FIG. 3 is a control block diagram for location awareness of a mobile robot according to an embodiment of the present disclosure.

Referring to FIG. 3, the mobile robot 100 may include a user interface 120, an image acquirer 130, a position detector 140, a storage 180, and a controller 110, in addition to the components shown in FIG. 2.

The user interface 120 may be arranged on the top face of the main body 101 of the mobile robot 100, and may include input buttons 121 for receiving control commands from the user, and a display 123 for displaying information about operation of the mobile robot 100.

The input buttons 121 may include a power button for tuning on or off the mobile robot 100, a start/stop button for starting/stopping operation of the mobile robot 100, and a return button for returning the mobile robot 100 to the charging station 300.

The input buttons 121 may employ push switches for detecting pressure of the user, membrane switches, or touch switches for detecting contact of a body part of the user.

The display 123 may display information of the mobile robot 100 corresponding to a control command input by the user. For example, the display 123 may display the mobile robot's 100 operation state, power state, cleaning mode selected by the user, whether the mobile robot 100 is returning to the charging station 300, etc.

The display 123 may employ self-radiating Light Emitting Diodes (LEDs) or Organic Light Emitting Diodes (OLEDs), a Liquid Crystal Display (LCD) equipped with a separate light source, or the like.

Although not shown, the user interface 120 may include a touch screen panel (TSP) able to receive control commands from the user and display operation information corresponding to a control command in some embodiments.

The touch screen panel may include a display for displaying operation information and a control command that the user is able to input, a touch panel for detecting coordinates that comes in contact with a body part of the user, and a touch screen controller for determining a control command entered by the user based on the coordinates of contact detected by the touch panel.

The camera 150 is a kind of data acquiring device for obtaining real sensor data about where the mobile robot 100 is positioned.

The camera 150 may also be a device for capturing frames of an external image and converting the frames to digital signals, and may be configured to include a Charge Coupled Device (CCD) module or a Complementary Metal Oxide Semiconductor (CMOS) module.

The image acquirer 130 may include a module for converting a surrounding image of the mobile robot 100 to an electric signal that may be processed by the controller 110 and sending the electric signal to the controller 110.

The image provided by the camera 131 may be used by the controller 110 to detect a position of the mobile robot 100.

Although in the embodiment of the present disclosure, the camera 150 is illustrated as configured to receive data about a current position of the mobile robot 100, it may be replaced by any other device that may obtain surrounding images.

The mobile robot 100 may include various sensors for obtaining data, along with the camera 131 for capturing the surrounding images, or may obtain distance data in a real environment where the mobile robot 100 is located by measuring a distance to a target for measurement through scanning of a 2D sensor or 3D sensor.

A position detector 140 may measure a visual distance traveled from images captured by the image acquirer 130. The position detector 140 may eliminate motion blur in the captured image to estimate the visual distance traveled, and detect a position of the mobile robot 100 by comparing with motion-blur-free image. A process and method performed by the position detector 140 to determine a position of the mobile robot 100 will be described in connection with FIG. 4, for example.

The storage 180 is a memory for storing images captured by the camera 131 in real time, and storing a map of an environment where the mobile robot 100 operates, an operating program to operate the mobile robot 100, travel patterns, position and obstacle information of the mobile robot 100 acquired while the mobile robot 100 is traveling.

Furthermore, the storage 180 may also store user input information, such as control data to control operation of the mobile robot 100, reference data to be used in controlling operation of the mobile robot 100, operation data occurring while the mobile robot 100 is performing a certain function, setting data entered by the device 200 for the mobile robot 100 to perform a certain function, etc.

Alternatively, the controller 180 may serve as an auxiliary memory device to assist a memory 115 included in the controller 110 as will be described below, and may be implemented as a non-volatile storage medium that preserves the stored data even if the power to the cleaning robot 100 is out.

The storage 180 may include a semiconductor device drive 181 for storing data in a semiconductor device, a magnetic disc drive 183 for storing data in a magnetic disc, etc.

The travelers 160 may move the mobile robot 100 and may include, as shown in FIG. 2, wheel driving motors 161 and moving wheels 163.

The moving wheels 163 may be equipped on either side of the bottom of the main body 101, including left- and right-moving wheels arranged on the left and right of the mobile robot 100, respectively, with respect to the front of the mobile robot 100.

The moving wheels 163 may receive turning force from the wheel driving motors 161 to move the mobile robot 100.

The wheel driving motors 161 may produce turning force to turn the moving wheels 163, and include a left driving motor for turning the left moving wheel and a right driving motor for turning the right moving wheel.

The left- and right-driving motors may each receive a driving control signal from the robot controller 110 and operate independently. With these independently operating left and right driving motors, the left and right moving wheels may turn independently from each other.

The independent operation of the left- and right-moving wheels may enable various motions of the mobile robot 100, such as forward motion, reverse motion, turning motion, turning motion in place, and the like.

In addition, the travelers 160 may include motor driving circuits (not shown) for supplying driving current to the wheel driving motors 161 based on a control signal from the controller 110, power transfer modules (not shown) for transferring turning force of the wheel driving motors 161 to the moving wheels 163, rotation detection sensors (not shown) for detecting an angular displacement and rotating speed of the wheel driving motors 161 or moving wheels 163, etc.

The power unit 170 refers to an arrangement for supplying power to the mobile robot 100. The power unit 170 may include a battery electrically connected to the respective loads to drive the travelers 160 and the body 101 for supplying power thereto.

The power unit 170 may have any configuration as long as it is able to supply energy, without being limited thereto.

The controller 110 may control overall operation of the mobile robot 100.

The controller 110 may include an input/output (I/O) interface 117 for interfacing data in/out between the controller 110 and the respective components included in the mobile robot 100, a memory 115 for storing programs and data, a graphic processor 113 for performing image processing, and a main processor 111 for performing computational operation according to the program and data stored in the memory 113 and correcting first position information of the mobile robot 100, and a system bus 119 enabling communication among the main processor 111, the I/O interface 117, the memory 115, and the graphic processor 113.

The I/O interface 117 may receive an image from the image acquirer 130, and position information and results sensed by the position detector 140, and forward them to the main processor 111, the graphic processor 113, and the memory 115 via the system bus 119.

The I/O interface 117 may forward various control signals output from the main processor 111 to the travelers 160 and various control components of the mobile robot 100.

The memory 115 may fetch and memorize control program and control data to control operation of the mobile robot 100 from the storage 180, or may temporarily memorize images acquired by the image acquirer 130 or position information and results from the position detector 140.

The memory 115 may include volatile memories, such as Static Random Access Memories (S-RAMs), Dynamic RAMs (D-RAMs), or the like. It is, however, not limited thereto, and in some embodiments, the memory 115 may include a non-volatile memory such as a flash memory, a Read Only Memory (ROM), an Erasable Programmable Read Only Memory (EPROM), a Electrically Erasable Programmable Read Only Memory (EEPROM), etc.

The graphic processor 113 may convert an image acquired by the image acquirer 130 into a format to be stored in the memory 115 or storage 180, or may change the resolution or size of the image acquired by the image acquirer 130.

The graphic processor 113 may eliminate motion blur from a previous image obtained before the mobile robot 100 starts to travel, a surrounding image from a current position of the mobile robot 100, and a current image.

The main processor 111 may process images acquired by the image acquirer 130, detection results of the position detector 150 according to a program and data stored in the memory 115, control the travelers 160, correct the position of the mobile robot 100, or perform computational operation to correct a map based on the corrected position.

The process or computational operation of the main processor 111 as will be described below may be understood as a process or computational operation of the controller 110.

Embodiments of the present disclosure, a method for the mobile robot 100 to recognize its position, i.e., a visual odometry scheme is provided.

The position detector 140 may create patches in images captured by the camera while the mobile robot 100 is moving, estimate motion blur of the respective patches, and detect a position of the mobile robot based on the motion-blur-free patches.

Accordingly, in FIG. 3, the position detector 140 for the mobile robot 100 to detect its position is illustrated as being separated from the controller 110. However, as described above, the graphic processor 113 may eliminate motion blur from at least one image captured by the camera 131. The elimination of motion blur may be performed based on the motion blur estimated by the position detector 140.

Although in an embodiment of the present disclosure, the position detector 140 and the controller 110 are separately described, a series of processes performed by the position detector 140 may be performed in cooperation with the main processor 111 for controlling general operation of the mobile robot 100.

The components or modules shown in FIG. 3 are only by way of example for illustration, and other modules may be further included to implement the operation of the mobile robot 100.

Detection of a position of the mobile robot 100 are described.

Figure 4:
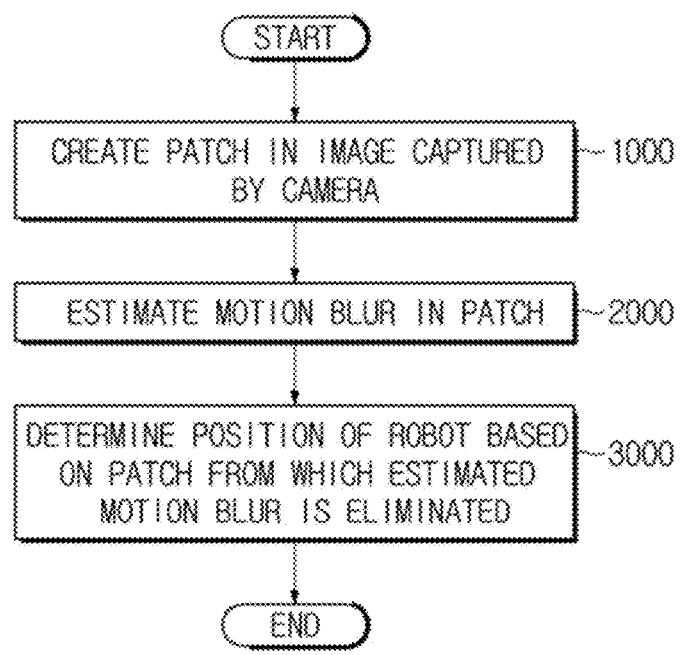
FIG. 4 is a flowchart illustrating how to detect a position of a mobile robot, according to an embodiment of the present disclosure.

FIG. 4 is a flowchart illustrating how to detect a position of a mobile robot according to an embodiment of the present disclosure.

Referring to FIG. 4, the method includes creating a patch in an image captured by the camera 131, in 1000, estimating motion blur in the created patch, in 2000, and detecting a position of the mobile robot 100 by comparison with the patch from which the estimated motion blur is eliminated, in 3000.

The position detector 140 creates a patch in a surrounding image of the mobile robot 100, in 1000.

The term "patch" herein refers to a region including a feature and some pixels around the feature in an image. An image of FIG. 8 includes a plurality of square boxes in an image captured by the camera 131. Here, each square box corresponds to a patch.

A feature represents a key point in the image. In other words, a feature is a point in the image, where the pixel value changes abruptly.

The position detector 140 identifies the features accordingly in the image captured by the camera 131, and creates patches including the features. The patches created in this way may have different forms depending on the resolution of the camera 131 equipped in the mobile robot 100 or the size of the image. Details of how to create patches are described in connection with FIG. 5.

The position detector 140 estimates motion blur in the created patches, in 2000.

Motion blur may be defined as a blur streaks effect from after-images of a subject, which may result from capturing a fast-moving object.

Accordingly, if the camera 131 equipped in the mobile robot 100 captures the surrounding of the mobile robot 100, the motion blur, i.e., a blur effect of a subject, may appear in the surrounding image captured by the camera 131 because of the movement of the mobile robot 100.

In a method for measuring a visual distance traveled (or a visual odometry scheme), the mobile robot 100 detects its position by comparing features in images captured at certain time intervals while moving around. In this case, features may not be accurately compared if comparison is performed with an image with motion blur, which might cause errors in detection of the position.

Accordingly, in an embodiment of the present disclosure, the motion blur occurring in an image captured by the camera 131 is eliminated for accurate tracking. Elimination of motion blur may be referred to as deblurring.

Image FIG. 9A is an image captured by the camera 131, the image blurred by motion blur. Image FIG. 9B is a clear image after the motion blur is eliminated, i.e., after deblurring. In an embodiment of the present disclosure, the position of the mobile robot 100 is tracked by comparison with a clear image, such as the image FIG. 9B.

Deblurring is performed based on information about movement of the camera 131 that has captured the image, i.e., movement information of the mobile robot 100.

The movement information may depend on a moving state of the mobile robot 100 or the configuration of the travelers 160, and even for images captured by the single camera 131, the motion blur appears differently depending on a distance between a surrounding object and the camera 131 and an amount of light incident on the lens of the camera 131.

Accordingly, in an embodiment of the present disclosure, Point Spread Functions (PSFs), which are blur information, of how motion blur has occurred in each patch in the captured image are created, and then deblurring is performed by using the PSF as an objective function to estimate motion blur. A specific method for estimating motion blur will be described in connection with FIG. 6.

The position detector 140 detects the position of the mobile robot 100 based on patches from which the estimated motion blur is eliminated, in 3000.

The position detector 140 estimates motion blur for each patch, and accordingly tracks the position of the mobile robot 100 through a clear image from which motion blur is eliminated.

The position detector 140 detects information about matching relations between features of the previous image and features of the current image, and detects the position of the mobile robot 100 by applying the matching relations in the least square method. A method for the position detector 140 to detect a position of the mobile robot 100 will be described in connection with FIG. 7.

Figure 5:
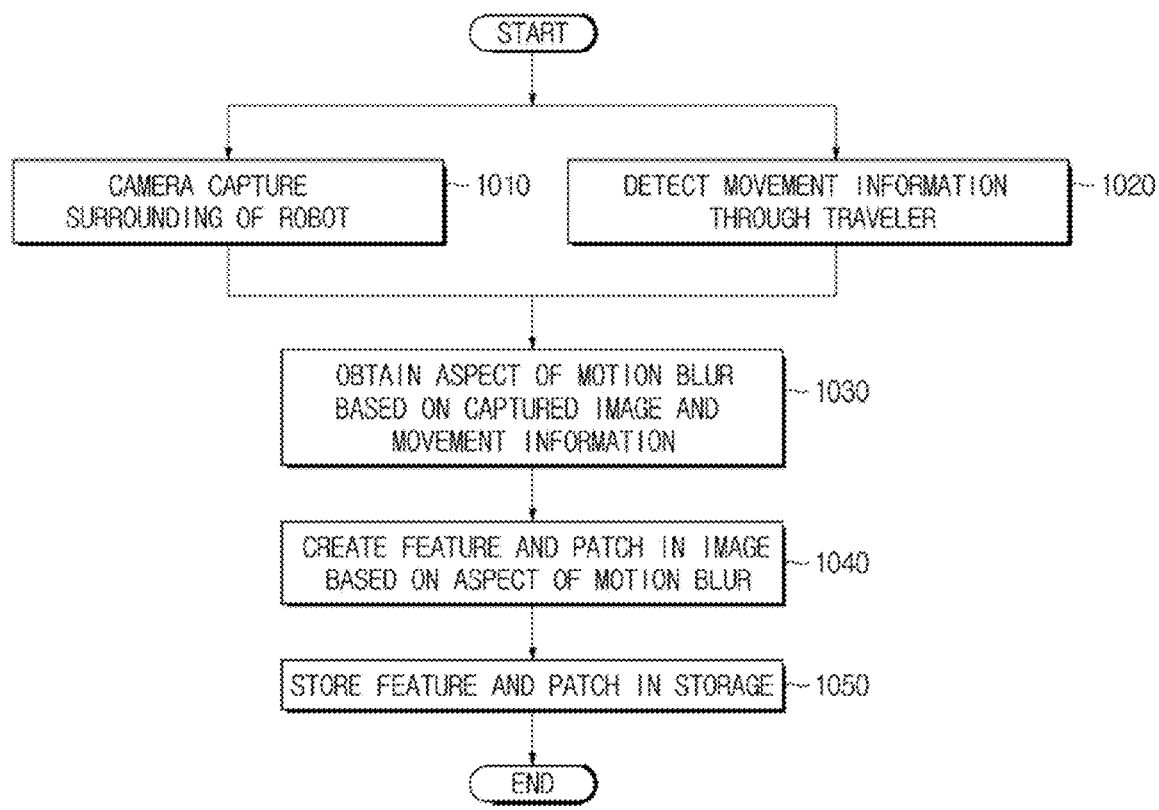
FIG. 5 is a flowchart illustrating a method for creating patches in a captured image according to an embodiment of the present disclosure.

FIG. 5 is a flowchart illustrating a method for creating patches in a captured image, according to an embodiment of the present disclosure.

Referring to FIG. 5, the position detector 140 obtains an aspect of motion blur in the current image based on the image captured by the camera 131 and the movement information of the mobile robot 100, in 1030. The position detector 140 creates features and patches in the image based on the obtained aspect of the motion blur, in 1040.

The camera 131 captures surroundings of the mobile robot 100, in 1010. The controller 110 detects movement information through movements of the travelers 160, in 1020.

There may be various methods for the controller 110 to obtain the movement information of the mobile robot 100 from the travelers 160.

For example, in a case that the travelers 160 are implemented with moving wheels 163, the controller 110 may measure a motor rotation speed of the wheel driving motors 161, or may obtain the movement information by e.g., the radius of the driving wheel 163.

Meanwhile, upon reception of an electric signal converted by the image acquirer 130 from an image captured by the camera 131, the controller 110 may control the graphic processor 113 to convert the electric signal to an image. The controller 110 may store the image converted in this way in the memory 115 or the storage 180.

The controller 110 may also control the main processor 111 to obtain movement information and store the movement information in the memory 115 or the storage 180.

The controller 110 may send the captured image and the movement information to the position detector 140.

The position detector 140 obtains an aspect of motion blur based on the captured image and the movement information, in 1030.

The aspect of motion blur refers to an extent to which the motion blur has occurred and a change in pixel due to the motion blur.

The aspect of motion blur in the current image may be predicted by using movement information and information about locations in a 3D space that the features in the previous image stored in the storage 160 represent.

The previous image herein represents a map (3D map) captured by the camera 131 and stored, and camera movement information may be obtained using a change in movement of the mobile robot 100 and a position of the mobile robot 100 before movement, i.e., a previous position of the camera 131, as expressed in the following equations 1 and 2:

$$a^k = a\,\log((P_T^{k-1})^{-1} \cdot P_T^k) \qquad (1)$$

$$\widehat{P}_T^k = P_T^{k-1} \cdot \exp(a^{k-1}) \qquad (2)$$

where $a^k$ denotes a change in movement of the camera 131, $P_T^{k-1}$ denotes a previous position of the camera 131, and $P_T^k$ denotes a current position of the camera 131. The position of the camera 131 may be represented as a 4×4 matrix P, and a change of the position of the camera 131 may be obtained by multiplying with a matrix of changes.

The current position of the camera 131 may be obtained by multiplying the change in movement of the camera 131 by the previous position of the camera 131, based on which the movement information may be determined.

The aspect of motion blur may be predicted using the movement information as calculated above and the following equations 3, 4 and 5:

$$\Delta\theta_b = \frac{T-t_0}{T}\Delta\theta = \frac{T-t_0}{T}\left(\theta^k - \theta^{k-1}\right) \quad (3)$$

$$I(\Delta\theta) \approx T + (a \times J_T \Delta\theta) + (b \times \Delta\theta^T H_T \Delta\theta) \quad (4)$$

$$a = \frac{t_0+T}{2T}, \quad b = \frac{T^2+Tt_0+t_0^2}{3T^2} \quad (5)$$

where, θ denotes movement of a pixel or a change in movement of the pixel, and $J_T$ and $H_T$ refers to Jacobian and Hessian in time T, and a change in pixel value due to motion blur may be approximated using the second order Taylor expansion as expressed in equation 4.

As such, the position detector 140 may obtain an aspect of motion blur that will appear in the current image based on a geometrical relationship between 3D positions of features stored in the map and the movement information.

The position detector 140 then creates features and patches in the image from the obtained aspect of motion blur, in 1040.

The aspect of motion blur makes it easy to identify features in the current image. Accordingly, the position detector 140 may obtain an approximate locations of the features. Since the locations of the features may be approximately obtained, the position detector 140 may create patches around the features.

The patches may have many different forms depending on the resolution of the camera 131 or the size of the image.

The position detector 140 is controlled by the controller 110 to store the image with the patches created in the storage 160, in 1050.

Figure 6:
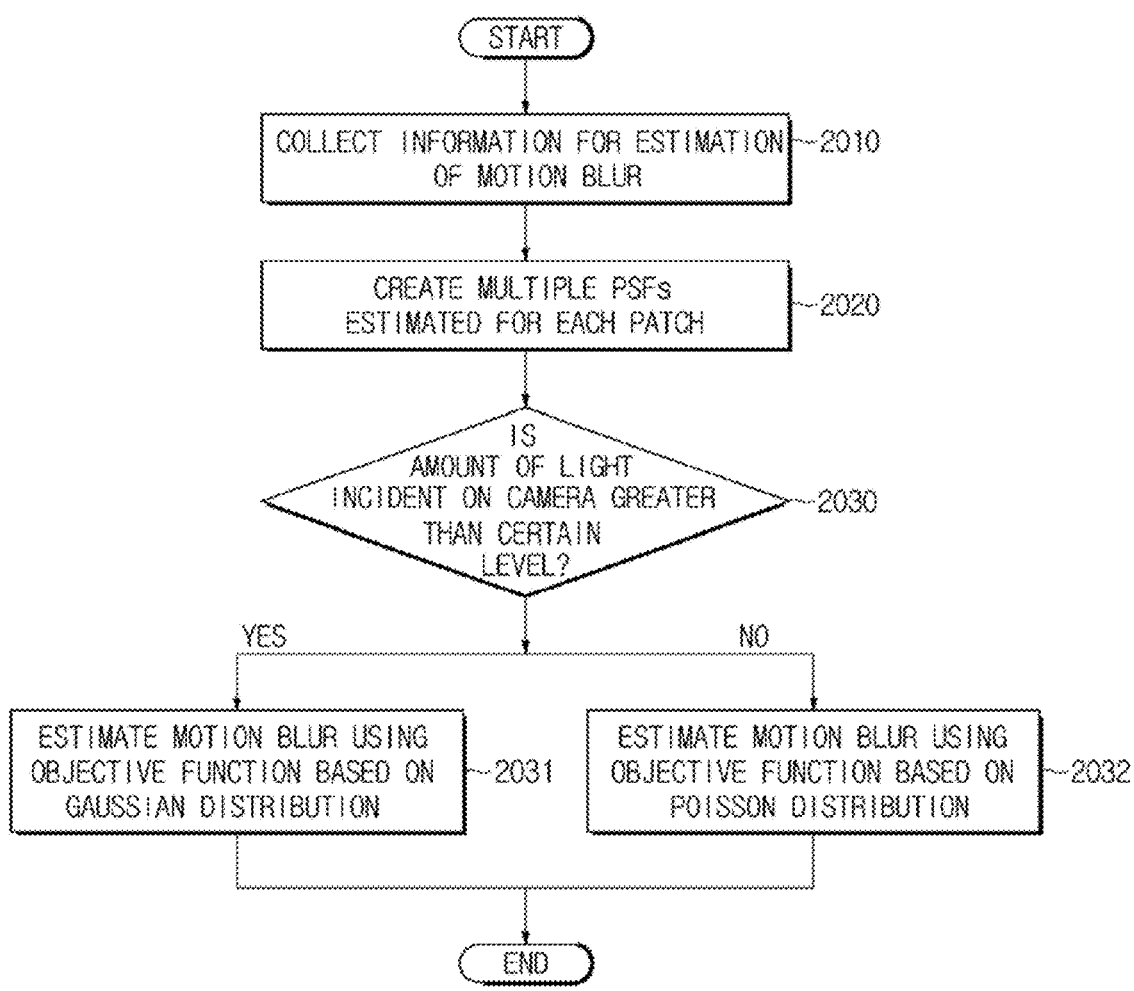
FIG. 6 is a flowchart illustrating a method for estimating motion blur in a patch created according to an embodiment of the present disclosure.

FIG. 6 is a flowchart illustrating a method for estimating motion blur in a patch created, according to an embodiment of the present disclosure.

Referring to FIG. 6, the position detector 140 first collects information in order to estimate motion blur, in 2010. The position detector 140 creates a plurality of pieces of blur information estimated for the respective patches based on the collected information, in 2020. The position detector 140 estimates motion blur to be applied for each patch by using an objective function employing Gaussian distribution or Poisson distribution based on an amount of light incident on the camera 131, in 2031, 2032.

Information for estimating motion blur includes 3D feature coordinates, movement information of the mobile robot 100, and an image capturing time interval of the camera 131.

The 3D feature coordinates refer to 3D coordinates of a surrounding object in contrast to the current image. The movement information refers to information calculated and stored in the storage 180 by the controller 110 as described above. The capturing time interval of the camera 131 refers to a capturing gap between the previous image and the current image.

The position detector 140 creates PSFs, which are blur information, for each patch based on the movement information, in 2020.

That is, the position detector 140 creates a plurality of PSFs for each patch based on at least one of the 3D feature coordinates, the movement information of the mobile robot 100, and the capturing time interval of the camera 131.

The PSFs may have various forms, such as straight lines, curves, and diagonal lines. The PSFs created in this way become the basis for elimination of motion blur. Details of the PSFs are described in connection with FIG. 10.

The position detector then estimates the most proper motion blur among the plurality of PSFs using an objective function, in 2031, 2032.

The position detector 140 designates initial motion blur among the plurality of PSFs based on the aspect of motion blur. Then, motion blur to satisfy the objective function is estimated under assumption that light is incident with Gaussian or Poisson probability based on the initial motion blur.

Gaussian probability refers to a normal distribution, a type of continuous probability distribution. The normal distribution has a shape determined by two parameters: mean μ and standard deviation a. The Poisson distribution refers to a discrete probability distribution that represents how many times an incidence occurs in a unit of time. That is, the Poisson probability refers to a certain probability determined by the Poisson distribution.

The estimated motion blur may be obtained by the following equations 6 and 7:

$$g = f * H \quad (6)$$

First, a patch deblurred based on the motion blur may be modeled as in equation 6. Here, * denotes the convolution operation. 'f' denotes a motion-blurred patch, and 'g' denotes a clear patch. 'h' denotes blur information PSF.

The objective function may be established based on the Gaussian or Poisson distribution. Here, a probability of light incident on the camera 131 is the Poisson probability. However, if considerable light is incident, i.e., if it is not that dark, the probability of light incident on the camera 131 may be approximated by the Gaussian distribution. The objective function based on the Gaussian distribution is expressed as in equation 7:

$$\|f*h - g\|^2 \quad (7)$$

In other words, the position detector 140 estimates motion blur using the objective function based on the Gaussian distribution.

The objective function based on the Poisson distribution is expressed as in equation 8:

$$\|f*h - g \log(f*h)\|^2 \quad (8)$$

In other words, the position detector 140 estimates motion blur using the objective function based on the Poisson distribution.

Furthermore, in order to estimate more accurate motion blur, an objective function having an extra normalization term may be used. The objective function having an extra normalization term is expressed in the following equations 9 and 10:

$$\|f*h - g\|^2 + \gamma\|C(f)\|^2 \quad (9)$$

$$\|f*h - g \log(f*g)\|^2 + \gamma\|C(f)\|^2 \quad (10)$$

where γ (gamma) denotes a normalization factor, and C denotes a normalized matrix. A normalization term is added to the Gaussian distribution based objective function in equation 9, and a normalization term is added to the Poisson distribution based objective function in equation 10.

An image may be deblurred by creating the PSFs to be applied for each patch in the current image and estimating motion blur for each patch using an objective function. This enables high accurate detection of position by comparison with the deblurred image to detect the position of the mobile robot.

Figure 7:
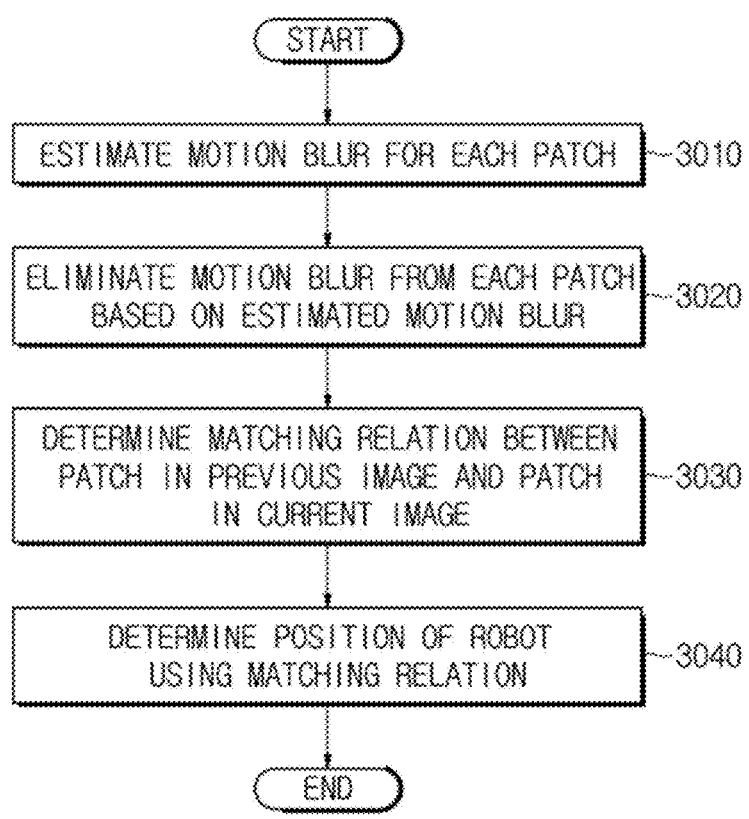
FIG. 7 is a flowchart illustrating a method for deblurring an image based on estimated motion blur and detecting the position of a mobile robot, according to an embodiment of the present disclosure.

FIG. 7 is a flowchart illustrating a method for deblurring an image based on estimated motion blur and detecting the position of a mobile robot, according to an embodiment of the present disclosure.

Referring to FIG. 7, in the embodiment of the present disclosure, motion blur for each patch is estimated, in 3010, and each patch is deblurred based on the estimated motion blur, in 3020. Matching relations between the respective patches is determined from a deblurred image in 3030, and the position of the mobile robot 100 is determined based on the matching relations in 3040.

The matching relations refer to positional relations of features between patches of the previous and current images. In this regard, the position detector 140 determines the matching relations by comparing a location of a feature in the previous image with a location of the feature in the current image.

Specifically, once the matching relations between features of the previous and current images are determined, the matching relations of the features may be applied in the least square method to determine a more accurate position of the mobile robot 100, i.e., the position of the camera 131.

The least square method (or weighted least square method) is a method for approximately finding solutions of a system equation such that a sum of squares of errors between approximate solutions and actual solutions is minimized.

This method of using the least square method to determine matching relations of features and determine a position is similar to what is known to the public. However, there is a difference in that embodiments of the present disclosure estimate motion blur using an objective function, use the estimated motion blur to deblur the respective patches, and determine a position of the mobile robot 100 by comparison with a more accurate image resulting from the deblurring.

Figure 8:
FIG. 8 shows an image having a plurality of patches created.

FIG. 8 shows an image having a plurality of patches created.

As described above, in the present disclosure, a plurality of patches may be created in an image captured by the camera 131. The image of FIG. 8 is the same as what is described above in connection with FIG. 4.

FIG. 9A and FIG. 9B illustrate images for explaining image deblurring based on wrong motion blur. Specifically, FIG. 9A show a deblurred image under assumption that a PSF appears to be straight lines.

The image a) of FIG. 9A is a deblurred image under assumption that a PSF appears to be straight lines, and image a) of FIG. 9B is a deblurred image based on a PSF suitable for each patch. Images b) of FIG. 9A and c) of FIG. 9A are expanded images of the respective patches in the image FIG. 9A, and images b) of FIG. 9B and c) of FIG. 9B are expanded images of the respective patches in the image FIG. 9B.

The image a) of FIG. 9B corresponds to an actual surrounding image, and the image a) of FIG. 9A is a deblurred image based on wrong blur information. Comparing the images a) of FIG. 9A and a) of FIG. 9B, it is seen from the expanded parts that the images a) of FIG. 9A and a) of FIG. 9B are different. Comparing the images b) of FIG. 9A and c) of FIG. 9A, it is seen that extents to which objects comprised of relatively white pixels overlap are different. Furthermore, comparing the images b) of FIG. 9B and c) of FIG. 9B, artifacts may be found on walls or smooth objects.

Consequently, if comparison is performed with an image deblurred based on wrong blur information, errors occur in detection of a position of the mobile robot 100. Accordingly, the present disclosure aims to increase accuracy in detection of a position of the mobile robot 100 by estimating accurate motion blur.

FIG. 10 is a diagram for comparison with an image deblurred using various forms of PSF.

Referring to FIG. 10, a first image 4001 is an original image of a current position taken by the camera 131 in a fixed position. That is, the first image 4001 corresponds to a surrounding image of the current position of the mobile robot 100 (4000).

A second image 4011 is an image with motion blur. In other words, the second image 4011 corresponds to an image taken by the camera 131 while the mobile robot 100 is traveling (4010).

In the present disclosure, deblurring may be performed by estimating motion blur in the image 4011 with motion blur, and the position of the mobile robot 100 is tracked based on the motion-blur-free image.

A mobile robot 100, for example, the position detector 140 creates patches around features in each image to estimate motion blur, and estimates motion blur from among a plurality of PSFs corresponding to the respective patches (4020).

In FIG. 10, the plurality of PSFs correspond to four boxes 4021 to 4024. The PSFs may have various forms, such as straight lines, curves, and diagonal lines.

If the mobile robot 100 travels in a curved shape, the camera 131 may capture images with motion blur. The position detector 140 estimates motion blur to be deblurred among the plurality of PSFs based on various information. The estimation uses an objective function.

If motion blur is eliminated based on a PSF in the form of straight lines instead of the curved form, an image 4031 that has a significant error from the original image 4001 may be created.

That is, as compared with the image 4032 reconstructed based on the PSF 4024 of the curved form, the image 4031 reconstructed based on the wrong PSF 4022 has a big error from the original image 4001, which reduces accuracy in location awareness of the mobile robot 100.

Accordingly, unlike the conventional technology that performs deblurring based on a PSF of straight lines, embodiments of the present disclosure reconstruct an image by estimating the most proper motion blur based on an objective function among various PSFs, thereby enabling accurate tracking in visual odometry.

According to an embodiment of the present disclosure, a mobile robot and method for controlling the same create patches of images captured by a camera while the mobile robot is moving around, estimates motion blur of the patches, corrects the position of the mobile robot based on the patch from which the motion blur is eliminated, thereby increasing precision in tracking and Visual SLAM and increasing reliability from a user in the product through accurate mapping.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A mobile robot comprising:
a main body;
a traveler configured to move the main body by a moving wheels or two legs;
a camera combined with the main body and configured to capture an image of a surrounding of the main body;
a position detector configured
to create a patch in the image captured by the camera,
to estimate motion blur of the patch by a processor, and
to track a position of the main body based on the created patch from which the motion blur is eliminated by the processor; and
a controller configured to control the traveler based on the position of the main body tracked by the position detector,
wherein the position detector is configured to
obtain an aspect of motion blur in the captured image based on the image captured by the camera and movement information of the main body determined by the controller,
detect a position of features in the captured image based on the obtained aspect of the motion blur and
create the patch based on the position of features, and
wherein the position detector
creates a plurality of pieces of blur information estimated for the patch,
selects motion blur of the patch from the plurality of pieces of blur information based on an objective function and
estimates the motion blur in the created patch based on the selected motion blur.

2. The mobile robot of claim 1, wherein the position detector is configured to create the plurality of piece of blur information based on at least one of three dimensional (3D) feature coordinates, movement information of the main body, and a capturing time interval of the camera.

3. The mobile robot of claim 1, wherein the at least the piece of blur information comprises a curved form of blur information.

4. The mobile robot of claim 1, wherein the position detector is configured to
estimate motion blur of the patch using a Gaussian distribution or a Poisson distribution as the objective function.

5. The mobile robot of claim 1, wherein the position detector is configured to estimate motion blur of the patch using the objective function to which a normalization term is added.

6. The mobile robot of claim 1, wherein the position detector is configured to determine matching relations between patches of previous and current images captured by the camera based on the patches from which motion blur is eliminated.

7. The mobile robot of claim 6, wherein the position detector is configured to track a position of the main body using the least square method based on the matching relations.

8. The mobile robot of claim 1, further comprising:
a storage configured to store an image captured by the camera and the patch created in the image.

9. A method for controlling a mobile robot, the method comprising:
capturing an image of a surrounding of a mobile robot;
creating a patch in the captured image;
estimating motion blur in the created patch; and
tracking a position of the mobile robot based on the created patch from which the estimated motion blur is eliminated,
wherein the creating of the patch in the captured image comprises
obtaining an aspect of the motion blur in the captured image based on the captured image and movement information of the mobile robot,
detecting a position of features in the captured image based on the obtained aspect of the motion blur and
creating the patch based on the position of features, and
wherein the estimating of the motion blur in the created patch comprises
creating a plurality of pieces of blur information estimated for the patch,
selecting the motion blur of the patch from the plurality of piece of blur information based on an objective function and
estimating the motion blur in the created patch based on the selected motion blur.

10. The method of claim 9,
wherein the estimating the motion blur in the created patch comprises:
creating the plurality of piece of blur information based on at least one of three dimensional (3D) feature coordinates, movement information of the mobile robot, and a capturing time interval.

11. The method of claim 10, wherein the at least the piece of blur information comprises a curved form of motion blur.

12. The method of claim 9, wherein the estimating the motion blur in the created patch comprises:
estimating the motion blur of the patch using a Gaussian distribution or a Poisson distribution as the objective function.

13. The method of claim 9, wherein the estimating the motion blur in the created patch comprises:
estimating the motion blur of the patch using the objective function to which a normalization term is added.

14. The method of claim 9, wherein tracking a position of the mobile robot based on the patch from which the estimated motion blur is eliminated comprises:
determining matching relations between patches of previous and current images captured, based on the patches from which the motion blur is eliminated, and
tracking a position of the mobile robot using a least square method based on the determined matching relations.

* * * * *